(12) United States Patent
Kilabarda et al.

(10) Patent No.: US 6,911,616 B2
(45) Date of Patent: Jun. 28, 2005

(54) WELD GUN ASSEMBLY

(75) Inventors: Velibor Kilabarda, Birmingham, MI (US); Fred A. Mannix, Walled Lake, MI (US); Ronald R. Hendricks, Sterling Heights, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 21 days.

(21) Appl. No.: 10/404,458

(22) Filed: Mar. 31, 2003

(65) Prior Publication Data

US 2003/0189029 A1 Oct. 9, 2003

Related U.S. Application Data

(60) Provisional application No. 60/370,816, filed on Apr. 8, 2002.

(51) Int. Cl.[7] .......................... B23K 11/30; B23K 11/31
(52) U.S. Cl. .................................... 219/86.61; 219/120
(58) Field of Search .......................... 219/86.25, 86.32, 219/86.8, 120, 86.61

(56) References Cited

U.S. PATENT DOCUMENTS

| | | | | |
|---|---|---|---|---|
| 2,351,230 A | * | 6/1944 | Powell ........................ | 219/120 |
| 3,525,848 A | * | 8/1970 | Bugaj ......................... | 219/119 |
| 4,114,017 A | * | 9/1978 | Smith .......................... | 219/90 |
| 4,531,041 A | * | 7/1985 | Larsson ...................... | 219/90 |
| 4,716,803 A | | 1/1988 | Waltonen ................... | 83/529 |
| 5,099,161 A | * | 3/1992 | Wolfbauer, III ............ | 310/80 |
| 5,750,953 A | * | 5/1998 | Sato et al. .................. | 219/90 |
| 5,789,719 A | * | 8/1998 | Pary et al. ............... | 219/86.25 |
| 5,818,007 A | * | 10/1998 | Itatsu ....................... | 219/86.25 |
| 6,337,456 B1 | * | 1/2002 | Taniguchi et al. ....... | 219/86.25 |
| 6,469,272 B2 | * | 10/2002 | Dugas et al. ............ | 219/86.32 |

FOREIGN PATENT DOCUMENTS

| | | | | |
|---|---|---|---|---|
| DE | 42 01 925 A1 | | 7/1993 | ........... B23K/11/10 |
| EP | 0 761 367 A1 | | 3/1997 | ........... B23K/11/11 |
| FR | 1.119.091 | | 6/1956 | ........... B23K/11/11 |
| FR | 1 119 091 | * | 6/1956 | ........... B23K/11/11 |
| FR | 1.329.747 | | 6/1963 | ........... B23K/11/11 |
| FR | 1 329 747 | * | 6/1963 | ........... B23K/11/11 |
| JP | 02-227583 | * | 10/1987 | ........... B23K/11/10 |
| WO | WO02/094496 | | 11/2002 | ........... B23K/11/31 |

OTHER PUBLICATIONS

Patent Abstracts of Japan, Publication No. 02307685A, published Dec. 20, 1990 from Application No. 01127872 filed May 23, 1989.

* cited by examiner

*Primary Examiner*—Kevin P. Kerns
(74) *Attorney, Agent, or Firm*—Young & Basile, P.C.

(57) ABSTRACT

A weld gun for performing a welding operation on a workpiece includes a pair of opposing arms, at least one arm movable relative to the opposing arm to apply pressure to the workpiece during a welding operation. A pair of identical or mirror image side plates support components of the weld gun to establish critical dimensions of the components relative to one another, while preventing tolerance buildup of critical dimensions at critical points. A guide block is connected to one of the opposing arms. The guide block has a non-circular aperture formed therein. An electrode adapter has a non-cylindrical rod portion slidably received in the non-circular aperture formed in the guide block for preventing rotation of the electrode adapter. A hose fitting is attachable directly to a rear end of the electrode adapter for communicating with an inlet water port and an outlet water port formed in the electrode adapter for providing a routing of coolant directly through the electrode adapter only.

16 Claims, 13 Drawing Sheets

WELD GUN ASSEMBLY

CROSS-REFERENCE TO RELATED APPLICATIONS

This application claims the priority of U.S. Provisional Application Ser. No. 60/370,816 filed on Apr. 8, 2002.

FIELD OF THE INVENTION

This invention relates to weld guns and more particularly to weld guns especially suitable for use in industrial automotive applications.

BACKGROUND OF THE INVENTION

Weld guns are in common usage in many industrial applications and in particular in automotive applications. Whereas a myriad of weld gun designs have been proposed and/or utilized commercially, there is still a need for a simpler weld gun design, providing a less expensive cost of assembly; for a weld gun design that is easier to service, thereby reducing servicing costs; and for a weld gun design that provides a longer life, thereby reducing replacement costs.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

A weld gun assembly according to the invention can include the following illustrated major component parts: a transformer 12; a base plate 14; at least one transformer mounting strap 16; a slide block 18; at least one side plate 20; at least one rail 22; a positioning cylinder 24; a clevis bracket 25; a spring lock 26, a spring cup 28; a threaded rod 30; an equalizing spring 32; a power cylinder 34; an electrode adapter 38; a guide block 40; a moveable cap adapter 42; a first cap 44; an electrode holder 46; a stationary cap adapter 48; a hose fitting 50; a second cap 52; at least one transformer terminal 54, 56; at least one shunt 58, 60; at least one shunt adapter 62, 64, 66; at least one nut 68, 70, 72; and a cooling tube 80.

Figure 12:
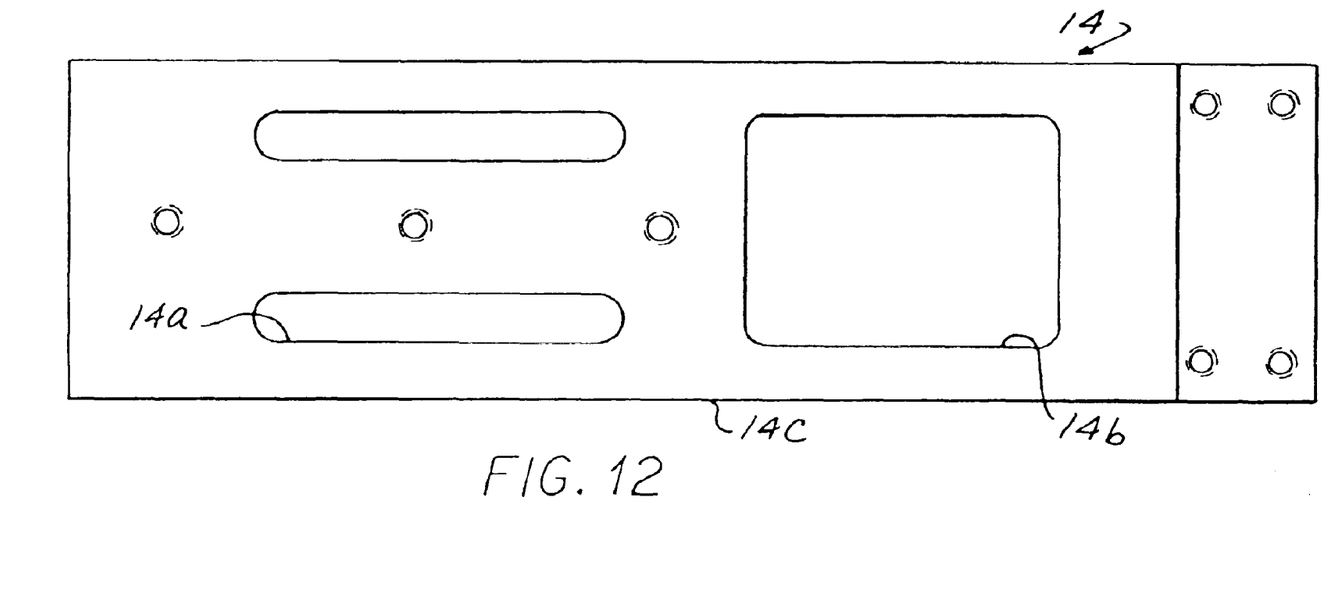
FIGS. 12 and 13 are plan and elevational views of a base plate used in the weld gun according to the present invention.
Figure 13:
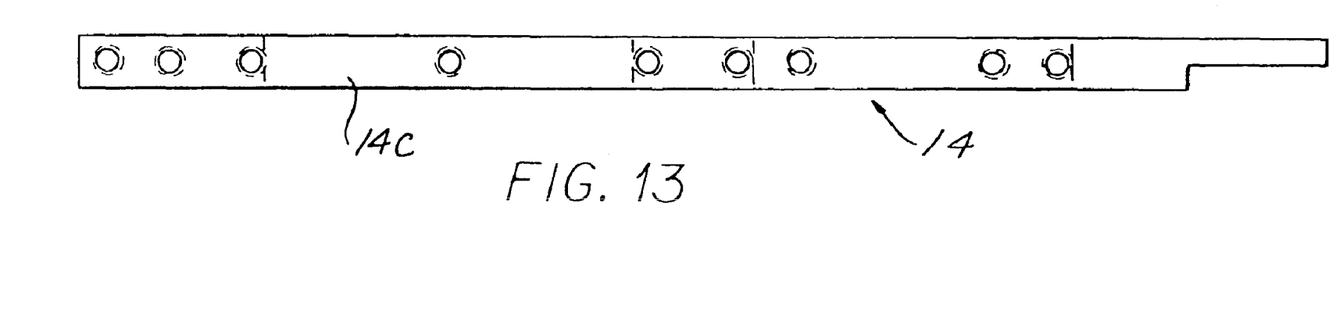
Figure 28:
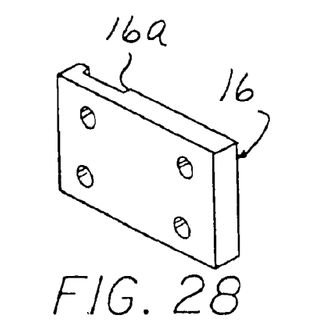

Main body transformer 12 is of known form and can have a monolithic rectangular configuration including a top face 12a and side faces 12b. Base plate 14 (FIGS. 12 and 13) can have a rectangular configuration generally corresponding to the configuration and dimensions of the top face 12a of the transformer 12. Base plate 14 can include a pair of slots 14a proximate the front end of the plate 14 and a rectangular opening 14b proximate the rear end of the plate 14. Transformer mounting straps 16 (FIG. 28) can be fixedly secured to the side face 12b of the transformer 12 and can include a notch 16a proximate the upper end of the strap 16 receiving a side edge 14c of the base plate 14 so as to mount the base plate 14 in overlying relation to the upper face 12a of the transformer 12 but spaced from the upper face 12a.

Figure 10:
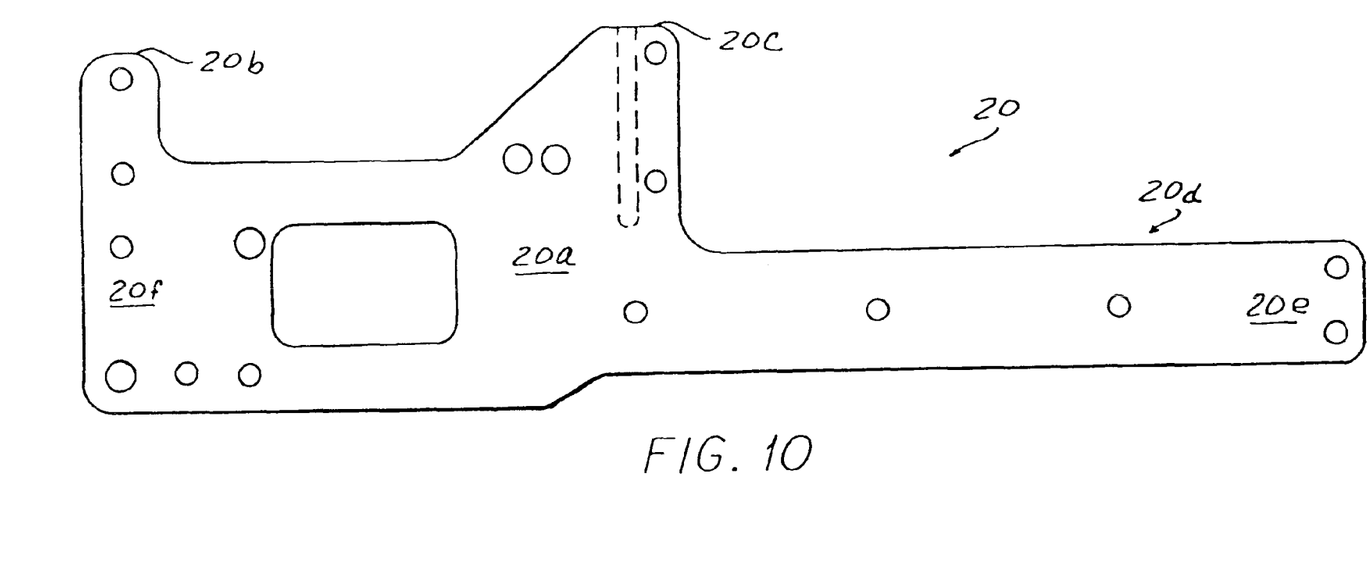
FIGS. 10 and 11 are elevational and plan views of side plates used in the weld gun according to the present invention.
Figure 11:
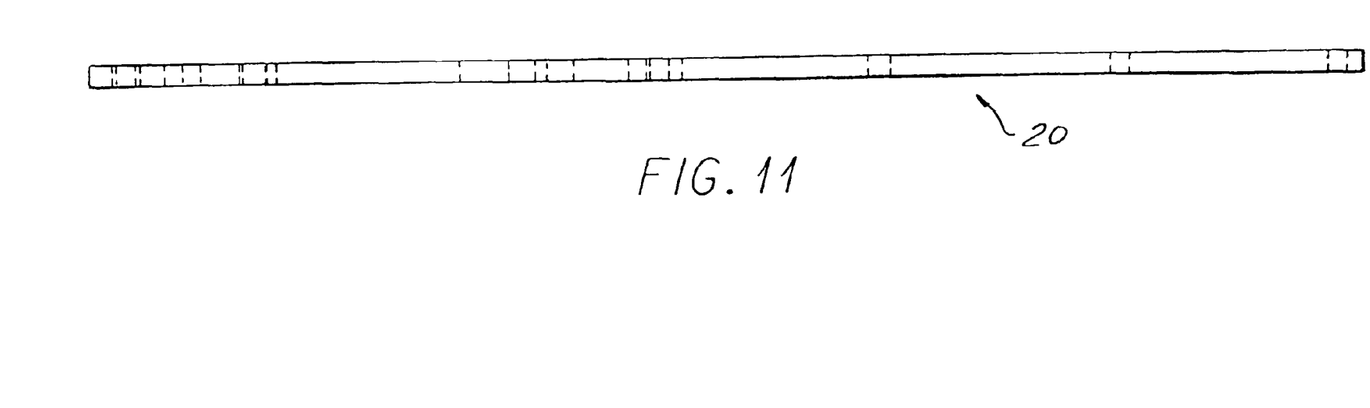
Figure 30:
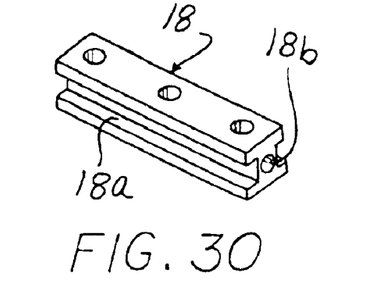
Figure 31:
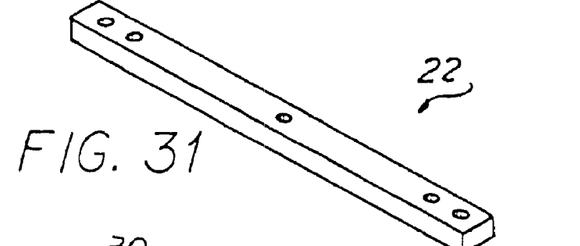

Slide block 18 (FIG. 30) can have an "H" shaped cross-sectional configuration defining opposed longitudinal guide grooves or keyways 18a. Slide block 18 is fixed to the upper face of base plate 14. Slide block 18 can be formed of aluminum and can include chrome plated equalizing keyways. Side plates 20 (FIGS. 10 and 11) can be identical to one another and disposed on opposite sides of the slide block 18. Each side plate 20 can include a main body portion 20a, a front pedestal portion 20b, an intermediate pedestal portion 20c, and a rear strap portion 20d terminating in a rear end 20e. Side plates 20 can preferably be formed of stainless steel. Rails 22 can be secured to the inboard faces of strap portions 20d and can be slidably received in the opposed keyways 18a of slide block 18 to mount the side plates 20 for sliding equalizing movement on the slide block 18.

Figure 26:
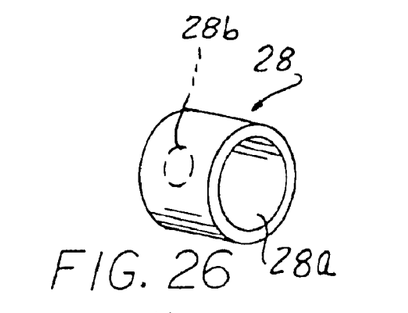

Positioning cylinder 24 can be carried by clevis bracket 25 which in turn can be mounted on a reduced thickness platform mounting portion 14d at the rear of base plate 14. Spring block 26 can be positioned between the rear ends 20e of side plates 20 to fixedly interconnect the rear ends of the side plates. Spring cup 28 (FIG. 26) can have a generally cup shaped configuration and can define a socket 28a sized to receive one end of spring 32.

Figures 32, 33, 34, 35, 38:
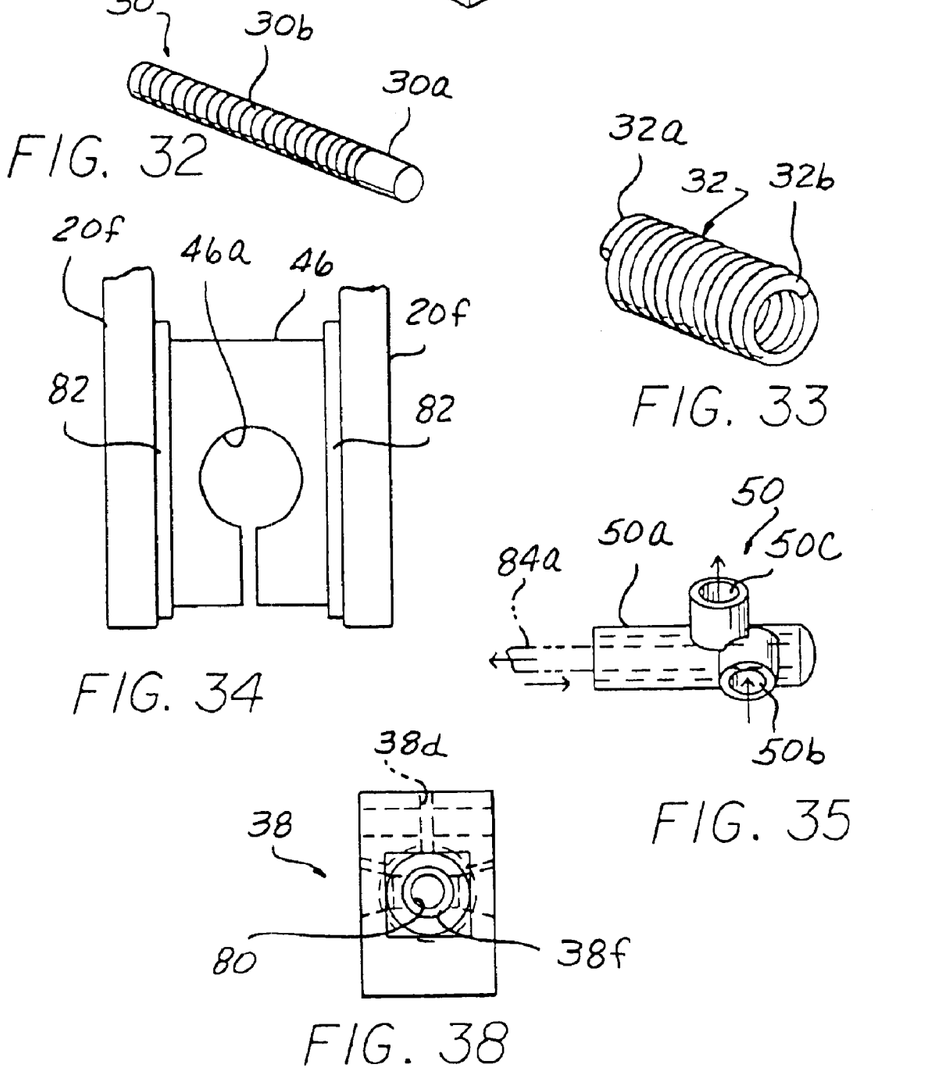
FIGS. 36, 37 and 38 are plan, elevational, and end views of an electrode adapter used in the weld gun according to the present invention.
Figure 36:
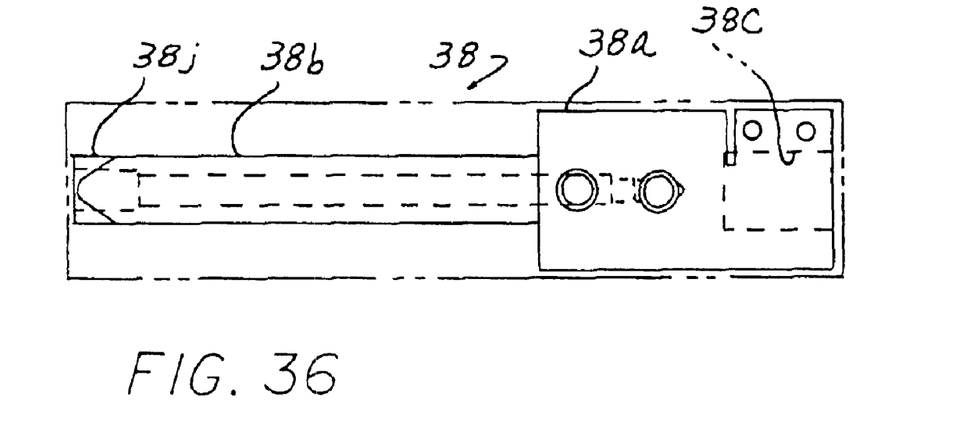
Figure 37:
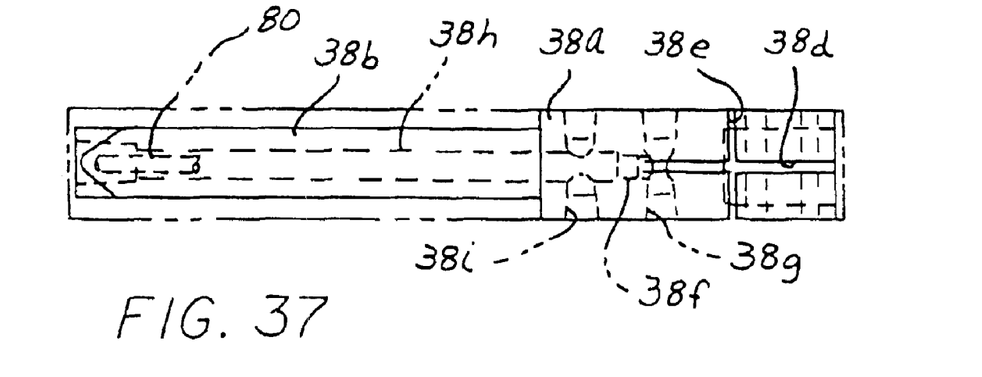

Threaded rod 30 (FIG. 32) can be fixedly secured at its rear end 30a to the piston of positioning cylinder 24 and can include a threaded portion 30b extending forwardly through a central aperture 26a in spring block 26 and through a central aperture 28b in the rear wall of spring cup 28. Nuts 68, 70 can be received on threaded portion 30b and can engage opposite side faces of spring block 26 to lock the spring block with respect to the threaded rod. A further nut 72 can be received on threaded portion 30b and can engage the rear wall of the spring cup 28 to adjustably mount the spring cup on the forward end of the threaded rod 30. Equalizer spring 32 can have a coil configuration and can be received at its front end 32a in a socket 18b in the rear face of slide block 18 and at its rear end 32b in the socket 28a of spring cup 28.

Figures 18, 19, 20, 21, 22:
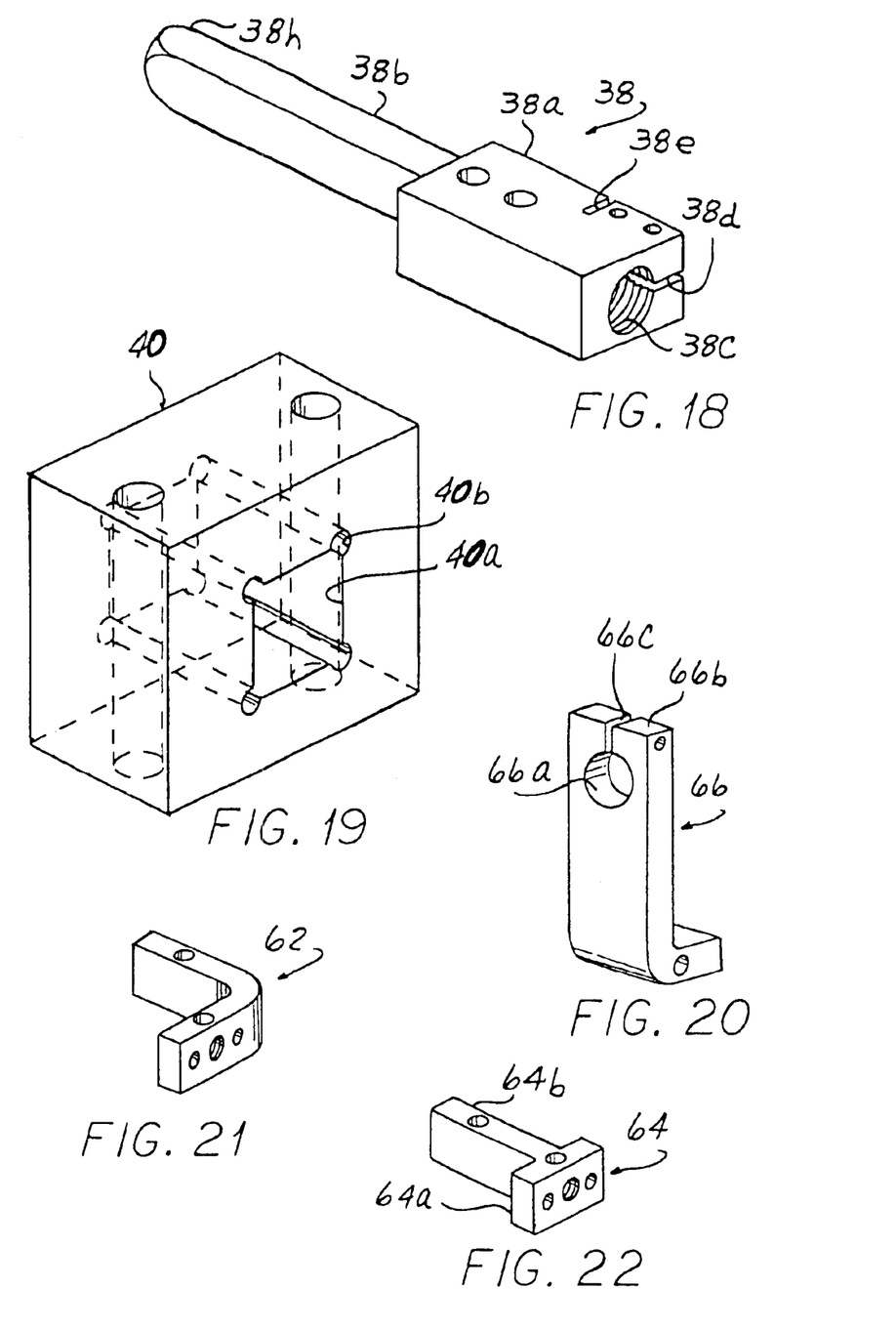

Power cylinder 34 can preferably be an air cylinder and can include a cylinder body 74 slidably mounting a piston (not shown), and a piston rod 76. The forward end 74a of the cylinder 74 can be fixedly mounted between the pedestal portions 20c of spaced side plates 20. Electrode adapter 38 (FIGS. 18, 35, 36 and 37) can include a monolithic, generally rectangular main body rear portion 38a and a forward rod portion 38b of rectangular cross-section. Main body portion 38a can include a socket 38c at its rear end receiving the front end 36a of piston rod 76. Main body portion 38a can be split at 38*d* and 38*e* to facilitate the grasping of the front end 36*a* of the piston rod 76 using fasteners 78. Adapter 38 can include a longitudinal bore 38*f* communicating with a transverse "in" bore 38*g* and a counterbore 38*h* communicating with a transverse "out" bore 38*i*. A tube 80 can be positioned in bore 38*f* to communicate with "in" bore 38*g*. Guide block 40 (FIG. 19) can be fixedly positioned between pedestal portions 20*b* of the spaced side plates 20 and can slidably receive the rod portion 38*b* of electrode adapter 38 via a square central passage 40*a* drilled at the corners 40*b* to facilitate the sliding movement of rod portion 38*b* in the guide block. Moveable cap adapter 42 can be fixedly mounted on the front end 38*j* of the rod portion 38*b* of electrode adapter 38 and first welding cap 44 can be fixedly positioned on the front end of the cap adapter 42.

It should be understood that, in known manner, the cooling tube 80 (FIG. 38) can extend forwardly through cap adapter 42 and into proximity with welding cap 44 and can be positioned in spaced relation to an interior bore of adapter 42 allowing cooling fluid to flow through "in" port 38*g* and through cooling tube 80 and into proximity with cap 44, whereafter the cooling fluid can leave the cap and flow around the cooling tube back through adapter 42 and rod portion 38*b* for discharge through "out" port 38*i*.

Figure 8:
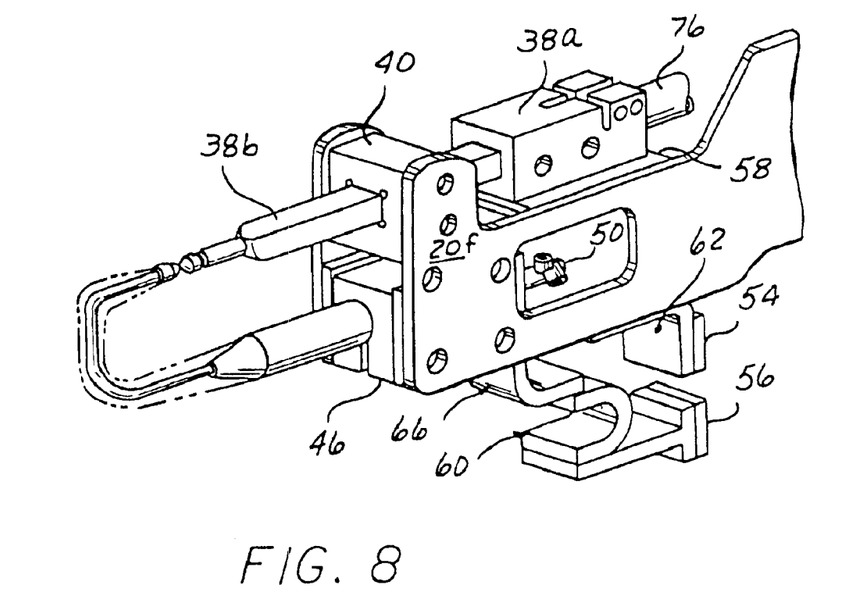
FIGS. 8 and 9 are fragmentary perspective views of the weld gun according to the present invention.
Figure 9:
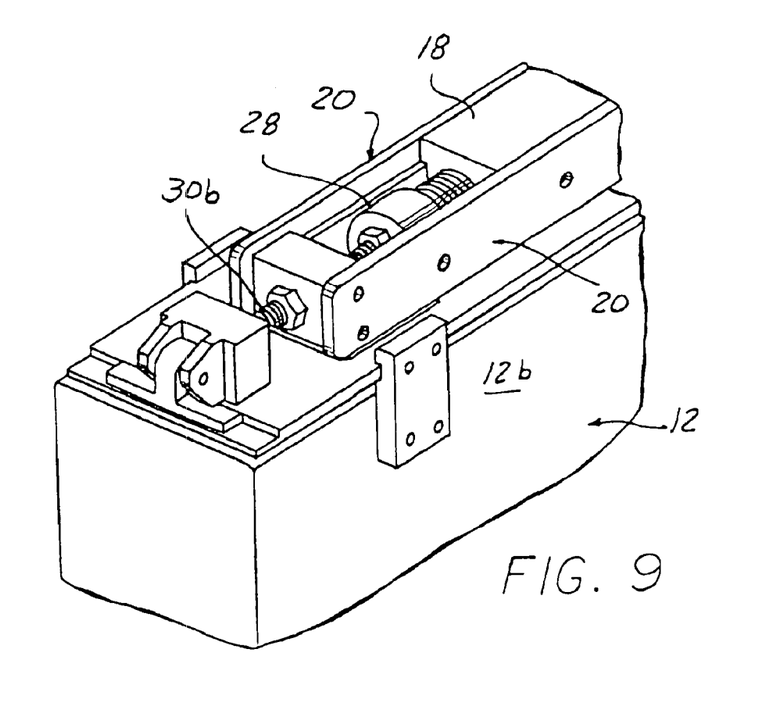
Figure 14:
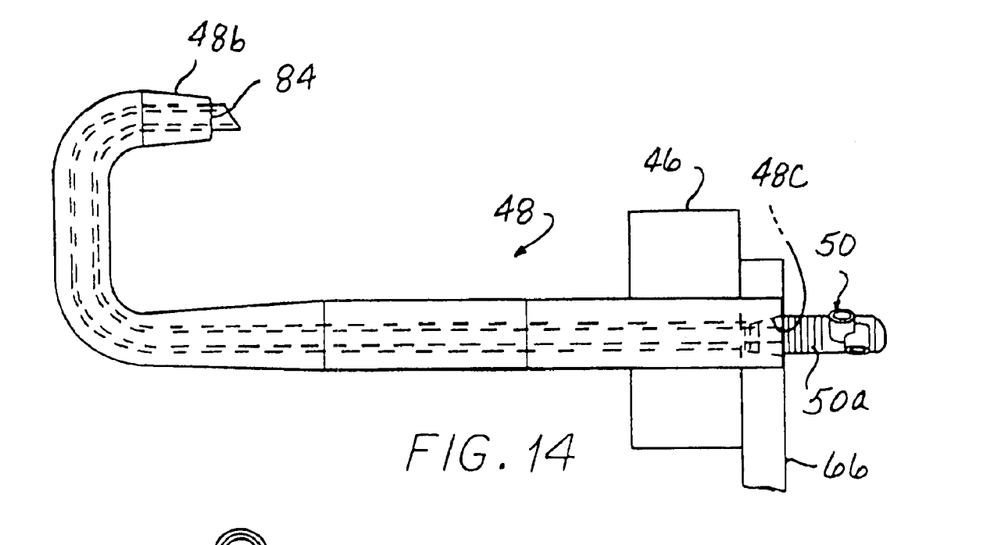
FIGS. 14, 15, and 16 are elevational, plan, and end views of a cap adapter used in the weld gun according to the present invention.
Figure 15:
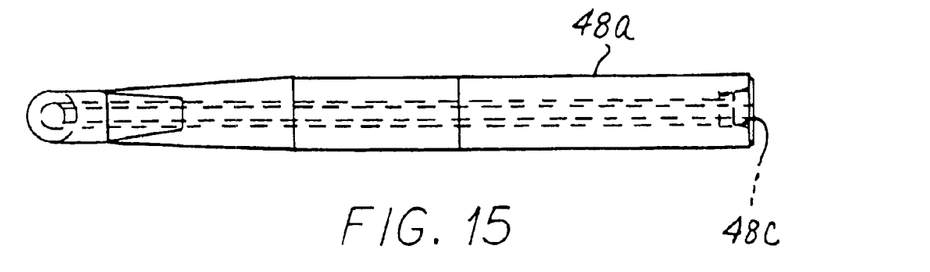
Figure 16:
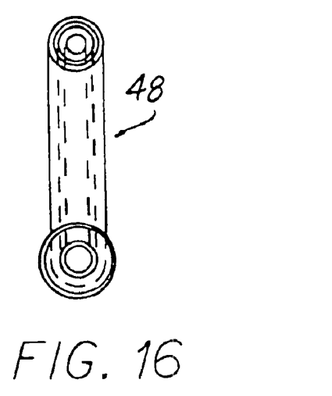
Figure 17:
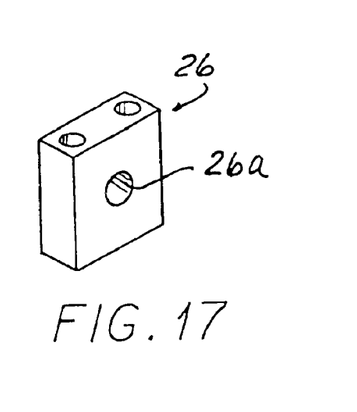
FIGS. 17–35 are perspective views of component parts of the weld gun according to the present invention.
Figure 27:
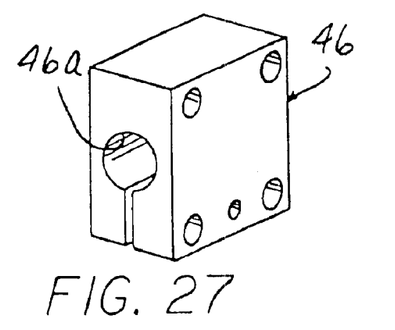
Figure 29:
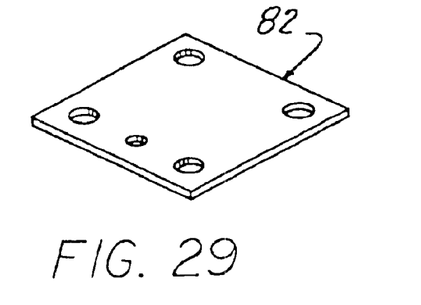

Electrode holder 46 (FIG. 27) can have a generally rectangular configuration and can be fixedly positioned between the front ends 20*f* of side plates 20 beneath guide block or holder 40. Electrode holder 46 can define a central aperture 46*a* for fixed receipt of stationary cap adapter 48. As seen in FIG. 8, electrode holder 46 can preferably be sandwiched between insulator plates 82 (FIG. 29) which can be formed for example of a mica or similar insulating material Stationary cap adapter 48 (FIGS. 14, 15 and 16) can be shaped depending on the particular gun configuration being employed. In the illustrated configuration of the welding gun, adapter 48 can have a tubular U-shaped configuration with a rear end 48*a* of the adapter positioned in and passing through the aperture 46*a* of electrode holder 46 and the other end 48*b* of the adapter 48 mounting the second welding cap 52. A central tube 84 can be positioned within a central bore 48*c* of adapter 48 and can extend through the adapter so as to provide, in known manner, means for introducing cooling fluid into the adapter for delivery to the welding cap and means for returning cooling fluid outside of the tube back to a cooling fluid discharge.

Hose fitting 50 (FIGS. 14 and 35) can include a threaded forward end 50*a* adapted to be threadably received in a threaded bore 48*c* in the rear end 48*a* of adapter 48 and can further include an "in" port 50*b* and an "out" port 50*c*. It should be understood that "in" port 50*b* can be configured to communicate with cooling tube 84 proximate the rear end 84*a* of that tube and "out" port 50*c* can be configured to communicate with an annular area outside of the tube end 84*a* to receive the return fluid flow.

Figure 1:
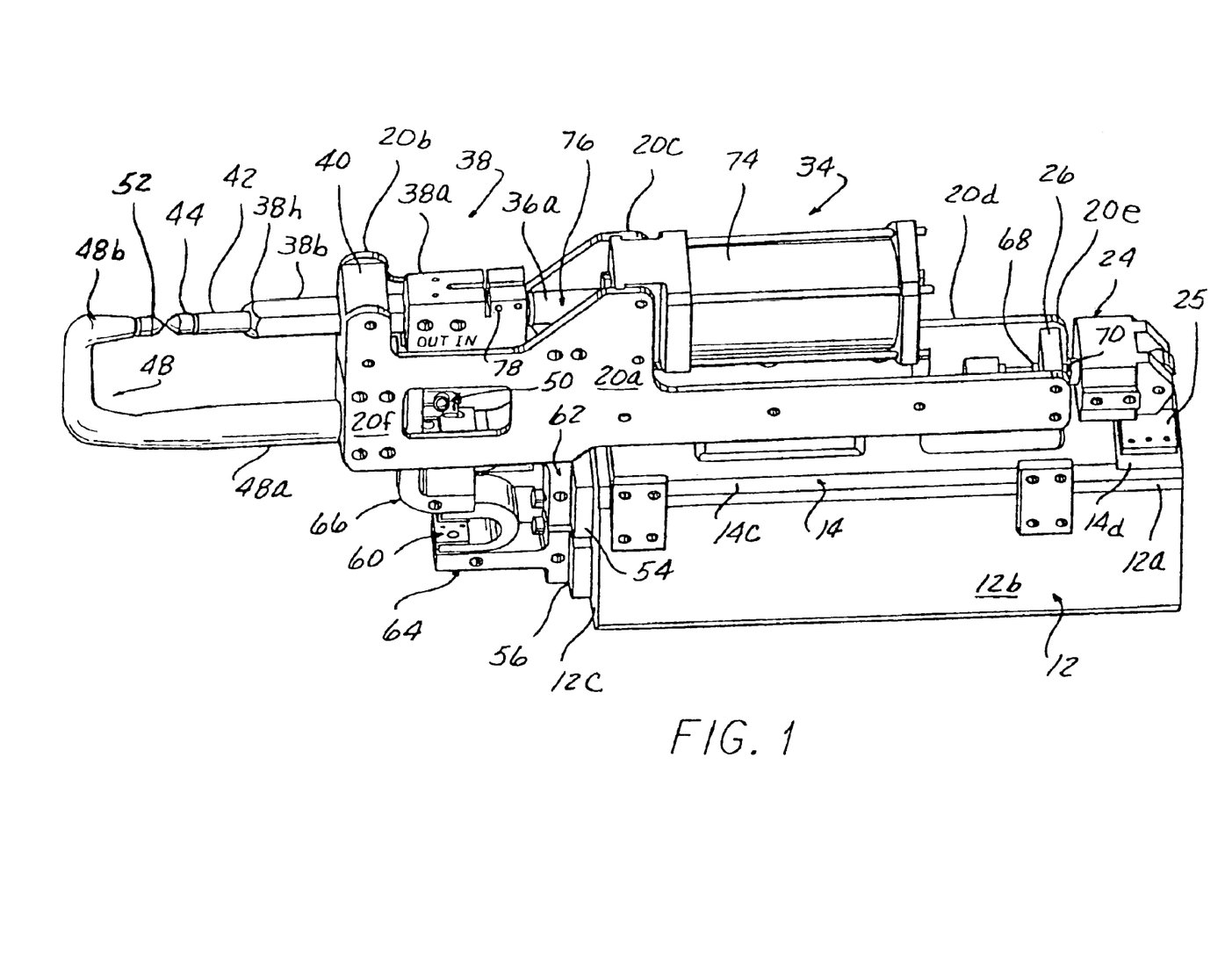
FIGS. 1, 2 and 3 are perspective views of the weld gun according to the present invention.
Figure 2:
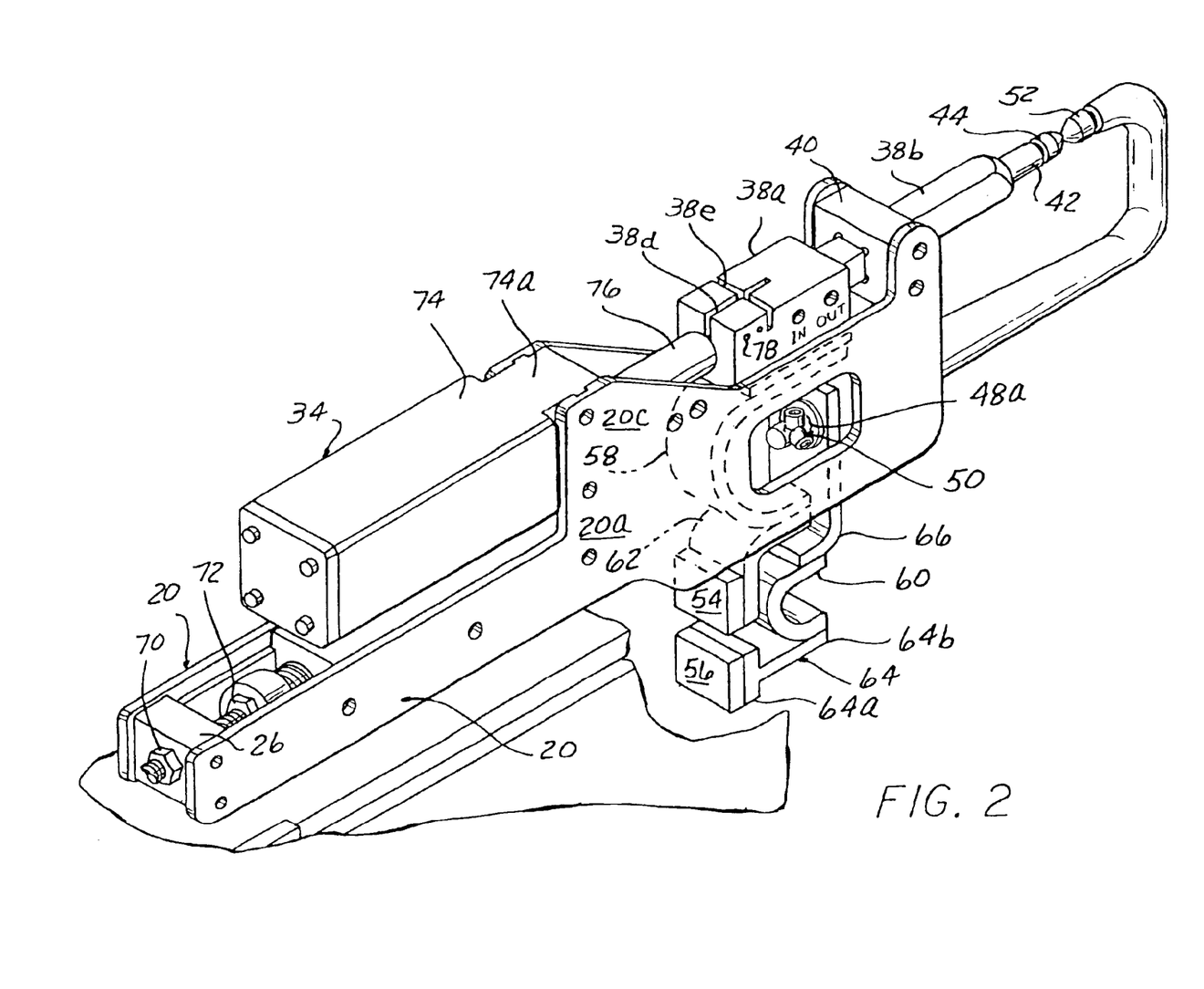
Figure 3:
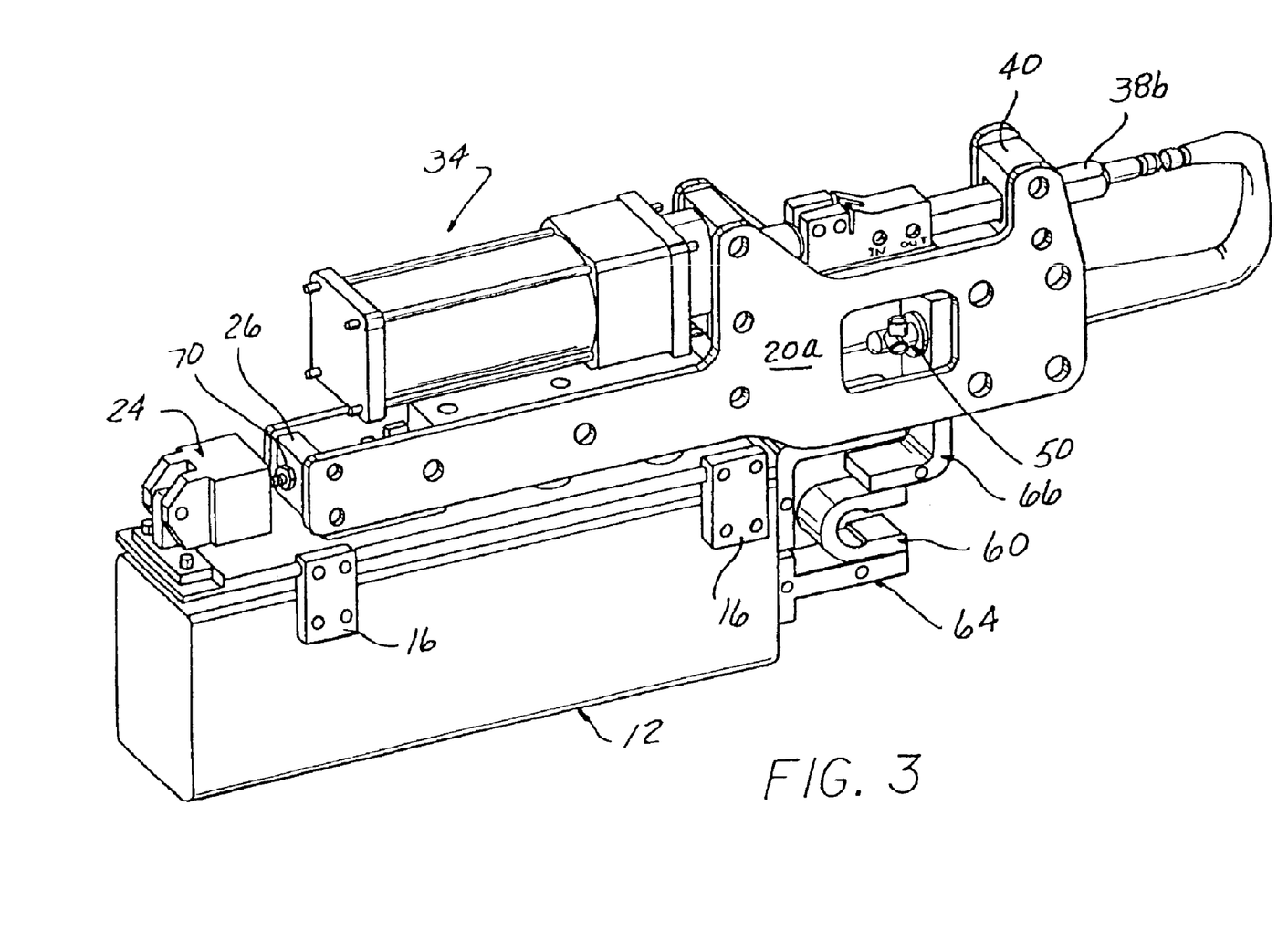
Figure 4:
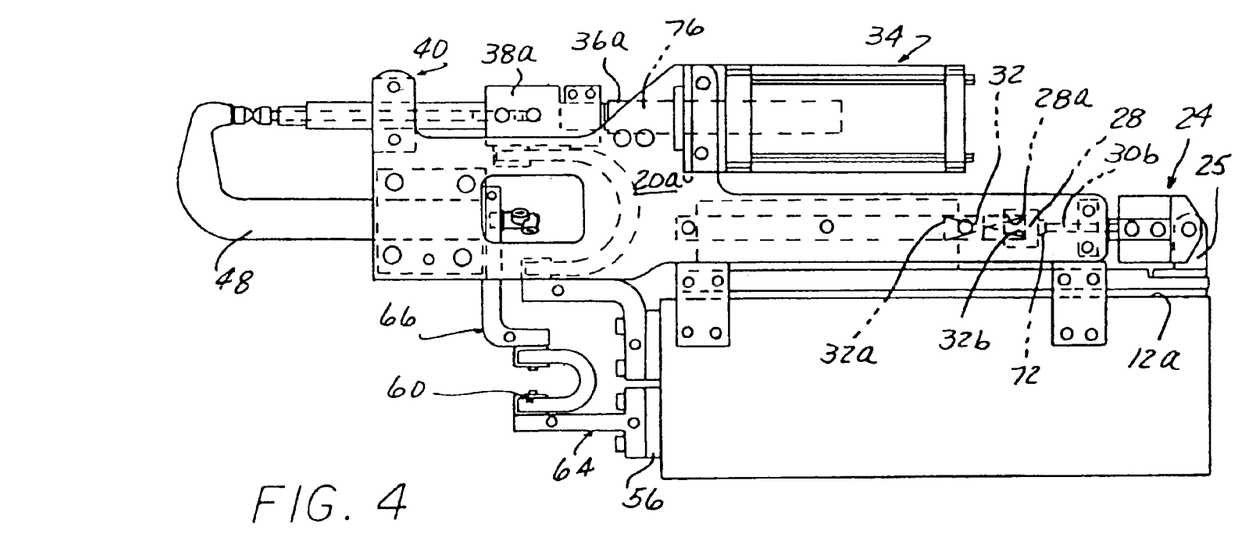
FIGS. 4, 5 and 6 are elevational, plan, and end views of the weld gun according to the present invention.
Figure 5:
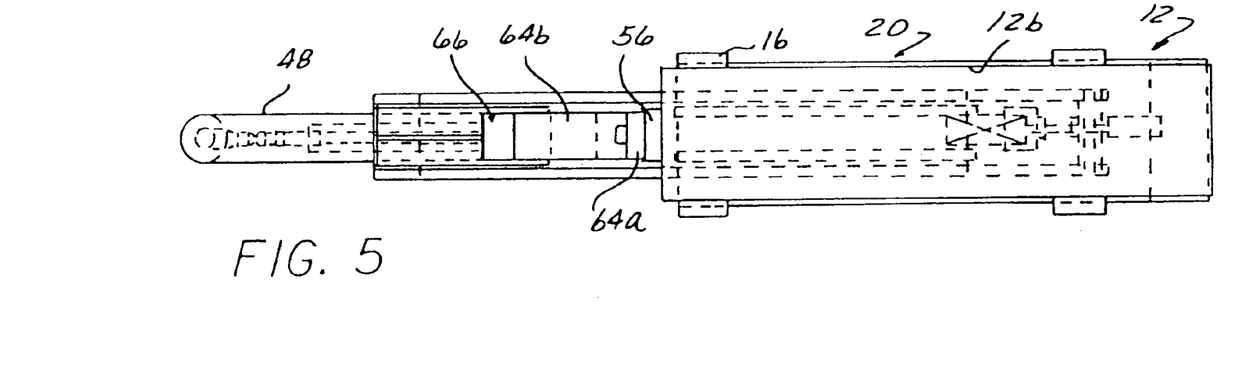
Figures 6, 7:
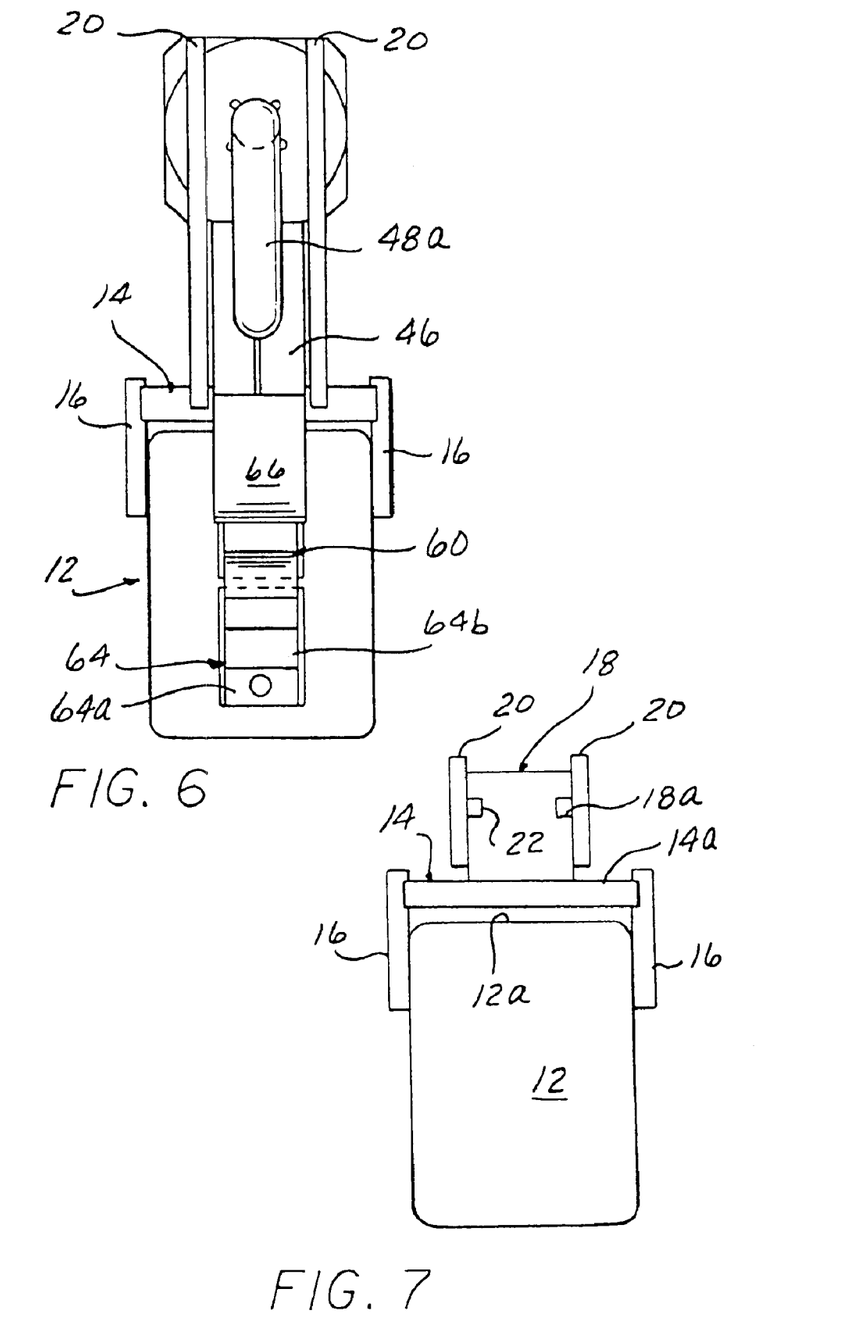
FIG. 7 is a cross-sectional view of the weld gun according to the present invention.
Figure 24:
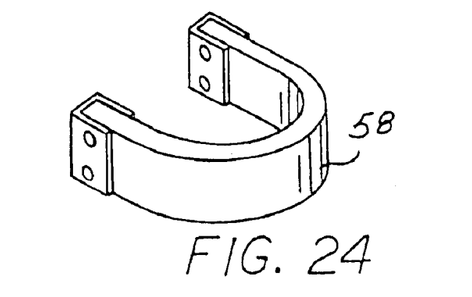
Figure 25:
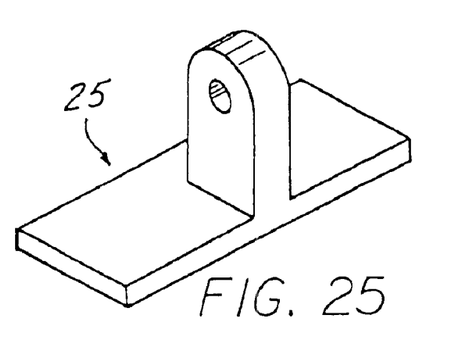

Transformer 12, in known manner, can include terminals 54 and 56 positioned on the front face 12*c* of the transformer. Shunt adapter 62 (FIGS. 8 and 21) can have an L-shaped configuration and can be fixedly and electrically secured to the front face of terminal 54. Shunt 58 (FIGS. 2 and 24) can have a U-shaped configuration and can extend between adapter 62 and the underface of the main body portion 38*a* of electrode adapter 38. It can be seen that adapter 62 and shunt 58 can coact to provide an electrical flow path from transformer terminal 54 to electrode holder 38 to deliver electric power to welding cap 44.

Figure 23:
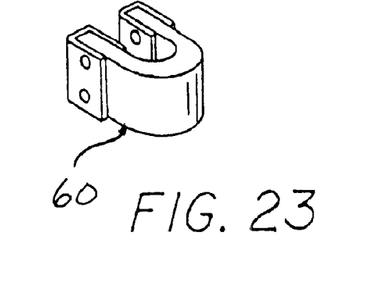

Shunt 58 can be of the laminated copper type and should be understood to provide flexibility as between the connection with the adapter 62 and the underface of block 38*a*. Adapter 64 (FIGS. 2 and 22) can have a T-shaped configuration including a T-bar portion 64*a* fixedly and electrically secured to transformer terminal 56 and a stem portion 64*b*. Adapter 66 (FIGS. 2 and 20) can have an L-shaped configuration and can define a central aperture 66*a* proximate the upper end 66*b* of the adapter. Aperture 66*a* can be intended to fit over the rear end 48*a* of adapter 48 as the rear end 48*a* projects rearwardly beyond the rear face of holder 46. The upper end of the adapter 66 can be fixedly secured to the rear end 48*a* of adapter 48 using a suitable fastener coacting with a split 66*c* to facilitate the squeezing engagement of adapter 66 with the rear end 48*a* of the adapter 48. This arrangement can allow the hose fitting 50 to readily and threadably access the rear end of adapter 48 without interference from the upper end of adapter 66 and without interference from electrode holder 46. Shunt 60 (FIGS. 8 and 23) can electrically interconnect adapter 66 and adapter 64 and, in known matter, can have a laminated copper construction to provide a flexible electrical interconnection between terminal 56 and welding cap 52 via adapter 64, shunt 60, adapter 66, and adapter 48.

In typical operation of the welding gun according to the present invention, the gun can be attached to a robot (as for example by attaching the robot to the side face 12*b* of the transformer); gross adjustment of the overall welding gun can be performed using the robot; fine adjustment of the overall welding gun can be performed using positioning cylinder 24; and adjustment of the space or gap between the welding caps 44/52 to grip the item to be welded can be achieved using power cylinder 34 in combination with equalizing spring 32. Specifically, once the caps of the open gun have been positioned on opposite sides of the article to be welded, power cylinder 34 can be fired to bring cap 44 into engagement with one face of the article whereafter continued extending movement of piston rod 36 allows equalizing spring 32 to act to bring the cap 52 into engagement with the other face of the article to be welded.

Figure 39:
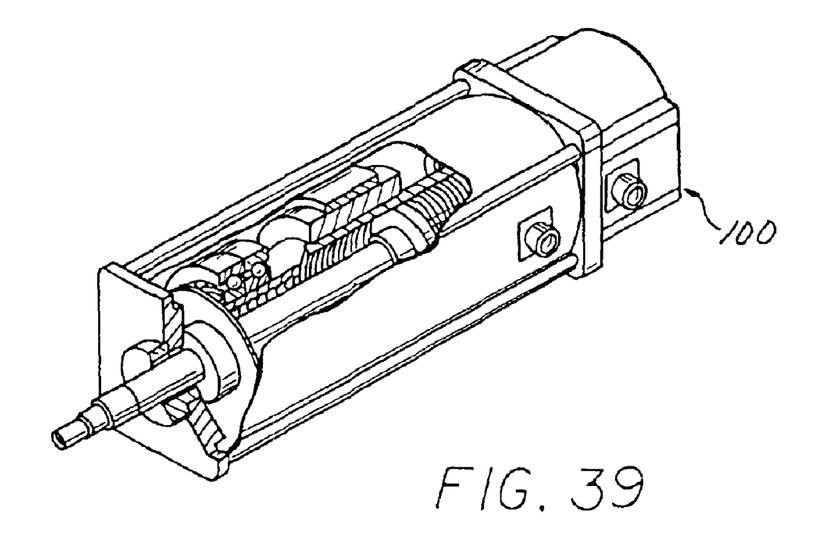
FIG. 39 is a perspective view of a servo motor optionally utilizable in the weld gun of the present invention.

The welding gun according to the present invention can provide many important advantages as compared to prior known welding guns. The square rod portion 38*b* of the electrode adapter can be slidably received in the square opening in the guide block 40 to preclude unwanted rotation of the electrode adapter. The design allows the ready interchange of the power cylinder 34 with a servo motor, such as for example the servo motor 100 shown in FIG. 39. The use of the identical side plates 20 to establish all of the critical dimensions of the components of the gun can insure that tolerances will be maintained on all of the critical dimensions and at all of the critical points. The use of the identical side plates 20 further can simplify reconfiguration of the gun since the shape and configuration of the side plates can be changed to accommodate a different welding requirement while continuing to use much of the same components of the welding gun in the new configuration. The rod portion 38*b* of the adapter 38 can be chrome treated to enhance work characteristics and reject weld splatter. The use of insulating plates 82 to embrace the electrode holder 46 can allow a metal to metal configuration at the arm engagement and the holder to prevent rotation of the arm under usage. The design can allow dual attachment points of the electrode adapter or shunt adapter to allow for a new attachment point after a wear failure or electrical arcing failure. The use of the hose fitting 50 attached directly to the rear end of electrode adapter 48 for coaction with tube 84 can simplify the connection of the inlet water and the outlet water to the electrode adapter 48 and specifically avoids complex routing of the coolant through the gun frame. The design of electrode adapter 38 can allow the in and out ports in the adapter main body portion 38a to communicate directly with the central bore in the adapter as well as with the central tube to simplify electrode construction and provide a more direct routing of the in and out coolant, thereby avoiding complex routing of the coolant though the gun frame.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A weld gun for performing a welding operation on a workpiece comprising:
    a frame structure including an electrode holder structure;
    first and second electrode assemblies mounted in spaced relation in the electrode holder structure, each electrode assembly having a rear end positioned rearwardly of the electrode holder structure and a free end positioned forwardly of the electrode holder structure and defining an electrode tip;
    a shunt assembly including a shunt assembly end secured to the rear end of one of the electrode assemblies proximate the electrode holder structure; and
    a cooling hose fitting secured to the rear end of the one electrode assembly rearwardly of the shunt assembly end.

2. The weld gun of claim 1 wherein:
    the one electrode assembly is the first electrode assembly;
    the rear end of the first electrode assembly is fixedly secured in the electrode holder structure;
    the second electrode assembly is slidably mounted in the electrode holder structure; and
    the gun further includes an actuator mounted on the frame structure and drivingly engaging a rear end of the second electrode assembly.

3. The weld gun of claim 2 wherein:
    the electrode holder structure defines a non-circular aperture; and
    the second electrode assembly includes an electrode adapter having a non-circular portion slidably received in the non-circular aperture.

4. The weld gun of claim 3 wherein the non-circular aperture and the non-circular portion have a rectangular cross-sectional configuration.

5. The weld gun of claim 4 wherein:
    the electrode adapter of the second electrode assembly further includes a main body rear portion connected to the actuator and defining inlet and outlet ports for routing of a cooling fluid to the welding tip of the second electrode assembly.

6. The weld gun of claim 5 wherein:
    the gun further includes another shunt assembly electrically connected to the main body portion of the electrode adapter.

7. The weld gun of claim 2 wherein the gun further includes:
    a base structure slidably mounting the frame structure; and
    a further actuator mounted on the base structure and drivingly engaging the frame structure.

8. The weld gun of claim 1 wherein the frame structure includes a pair of side plates for supporting components of the weld gun to establish critical dimensions of the components relative to one another, while preventing tolerance buildup of critical dimensions at critical points.

9. The weld gun of claim 8 wherein the side plates are identical to one another.

10. The weld gun of claim 8 wherein the side plates are a mirror image of one another.

11. The weld gun of claim 8 wherein the side plates are interchangeable for readily reconfiguring into a different structural configuration to accommodate different welding requirements while allowing use of common components supported by the side plates in each configuration.

12. The weld gun of claim 8 wherein:
    the electrode holder structure comprises a first electrode holder fixedly mounting the rear end of the first electrode assembly and a second electrode holder slidably mounting the rear end of the second electrode assembly;
    the first and second electrode holders are mounted between the side plates; and
    the first electrode holder is sandwiched between insulating plates.

13. The weld gun of claim claim 1 wherein the gun further includes:
    a tube positioned within the one electrode assembly and coacting with the hose fitting for simplifying the delivery of a cooling fluid to the electrode tip of the one electrode assembly.

14. A weld gun for performing a welding operation on a workpiece comprising:
    a base structure;
    a frame structure slidably mounted on the base structure;
    a first actuator mounted on the base structure and including a piston rod drivingly engaging the frame structure;
    a first electrode assembly fixedly mounted on the frame structure;
    a second electrode assembly slidably mounted on the frame structure;
    a second actuator mounted on the frame structure and drivingly engaging the second electrode assembly; and
    an equalizing spring interposed between the piston rod of the first actuator and the base structure;
    the frame structure including an electrode holder fixedly receiving a rear end of the first electrode assembly with the rear end of the first electrode assembly positioned rearwardly of the holder; and
    the gun further including a shunt assembly including a shunt assembly end secured to the rear end of the first electrode assembly proximate the holder and a cooling hose fitting secured to the rear end of the first electrode assembly rearwardly of the end of the shunt assembly.

15. The weld gun of claim 14 wherein:
    the second electrode assembly includes an adapter having a forward rectangular portion slidably received in a rectangular opening defined in the frame structure and a rearward main body portion connected to the second actuator; and
    the gun further includes a further shunt assembly connected to the main body portion of the adapter.

16. The weld gun of claim 15, wherein the main body portion of the adapter includes inlet and outlet ports for the routing of a cooling fluid to an electrode tip of the second electrode assembly.

* * * * *